March 6, 1962

L. J. HAGENSON 3,024,059

COLLAPSIBLE AND EXPANDING HOUSE TRAILER

Filed Sept. 11, 1958

INVENTOR,
LEO J. HAGENSON.

BY
ATTORNEY

March 6, 1962  L. J. HAGENSON  3,024,059
COLLAPSIBLE AND EXPANDING HOUSE TRAILER
Filed Sept. 11, 1958  3 Sheets-Sheet 2
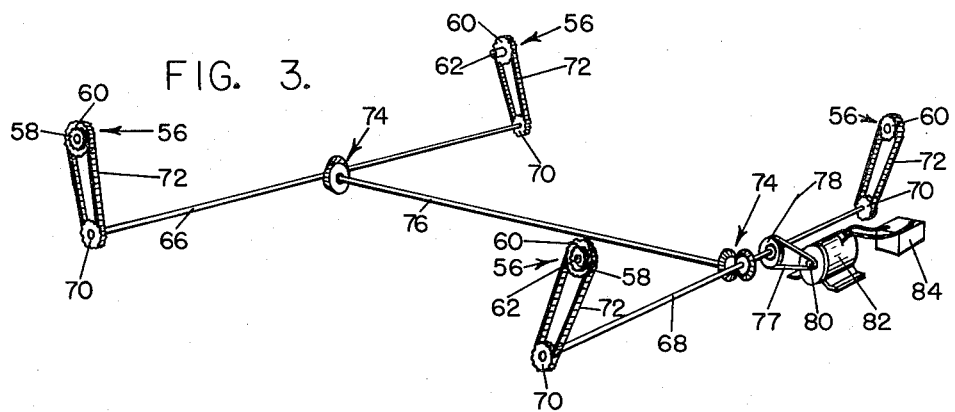
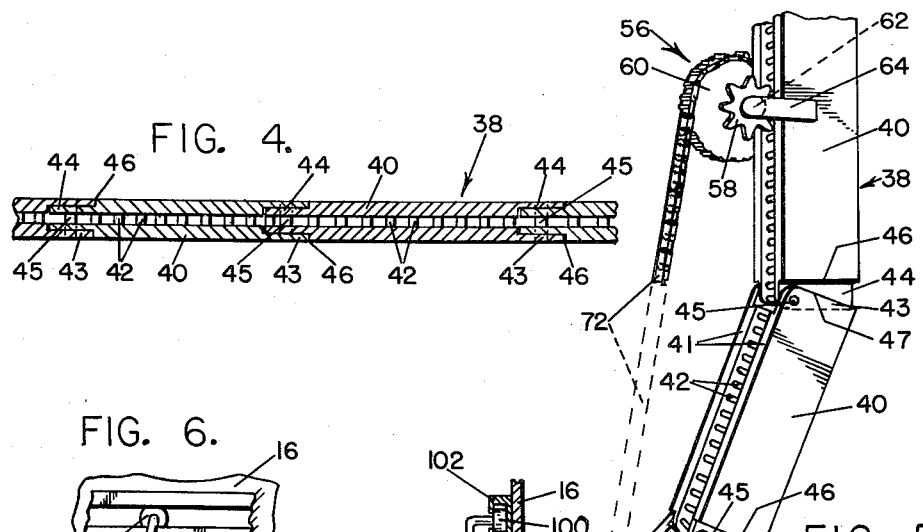
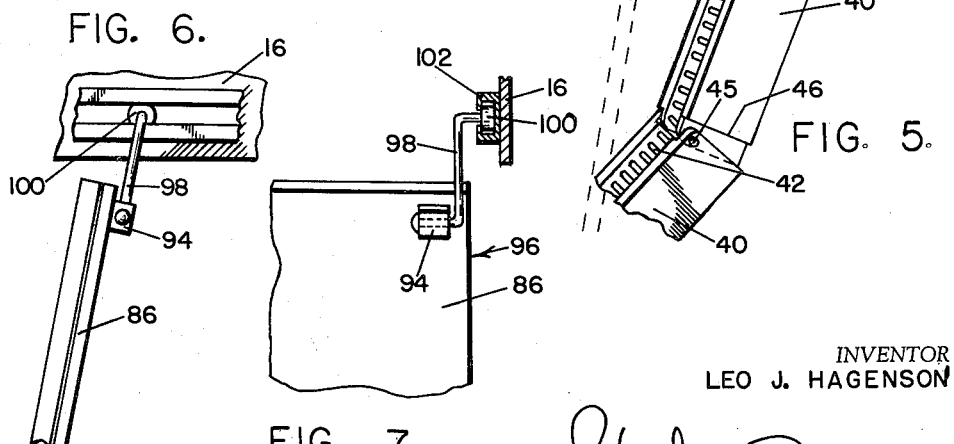
INVENTOR,
LEO J. HAGENSON.
BY Robert M. Dunning
ATTORNEY March 6, 1962 L. J. HAGENSON 3,024,059
COLLAPSIBLE AND EXPANDING HOUSE TRAILER
Filed Sept. 11, 1958 3 Sheets-Sheet 3

INVENTOR,
LEO J. HAGENSON.
BY
ATTORNEY

United States Patent Office 3,024,059
Patented Mar. 6, 1962

3,024,059
COLLAPSIBLE AND EXPANDING HOUSE TRAILER
Leo J. Hagenson, Hastings, Minn., assignor to Rolite, Inc., Grantsburg, Wis.
Filed Sept. 11, 1958, Ser. No. 760,456
6 Claims. (Cl. 296—23)

This invention relates to an improvement in house trailers and deals particularly with a type of trailer which may be expanded and collapsed.

One of the major objections to small house trailers lies in the fact that these units are normally bulky and cause considerable wind resistance while being drawn over the highway. This wind resistance results in a greater work load for an automobile which in turn results in greater consumption of fuel. Furthermore, house trailers of the non-collapsible type are usually expensive to produce materially and are thereby of greater cost to the consumer.

While the trailer must be sufficiently long to house the occupants of the car, during the daytime or between campsites the trailer is not usually occupied. Many types of collapsible and expanding trailers have been produced embodying various methods of operation ranging from manually erected canvas covers to more complex hydraulically operated structures which are heavy, cumbersome, and very expensive to produce.

With this thought in mind, this invention contemplates an improved collapsible and expanding trailer embodying simple but effective and durable means for automatically expanding and collapsing a trailer house.

The primary object of this invention is, therefore, to provide a house trailer having a bottom section and a top section which may be lowered down in super-imposed relation. When the trailer is to be occupied the top section is moved upwards. End panels connected to the lower section swing up simultaneously. Side wall panels connected to the lower section are manually raised into position connecting the top and bottom sections thus the size of the trailer may be materially changed in an extremely short time.

Another object of this invention resides in the particular manner in which the upper and lower sections are connected for vertical movement. The sections are connected by a plurality of opposed racks formed of links having spaced gear teeth pivotally connected to each other. One end of each rack is secured to the upper section preferably at the corners thereof and the other ends extend through guide members in the lower section. The link sections are so constructed as to flex in only one direction and rigidly abut when aligned. The racks are arranged in pairs so that the links of one rack can fold only in one direction and the links of the other rack can fold only in the opposite direction. When the top section is raised the opposed racks, each having its links abutting in vertical alignment will hold the links of the oppositely disposed rack from pivoting thereby holding the top section in solid superimposed spaced relation.

A further object of this invention lies in the provision of an automatic elevating mechanism which includes a series of sprockets engaged with the toothed links of the racks. Means are provided to drive the sprockets in unison, to raise and lower the sectional racks and the top section of the trailer supported thereby.

A still further object of this invention lies in the manner of connecting the end and side panels to each other designed to form the front and rear of the trailer as well as the side walls. The connection includes end and side panel extensions which are hingedly connected to the end panel and hingedly connected to each other and are designed to fold into right angular relation to the end and side panels providing a flush weather-sealed connection therebetween.

These and other objects and advantages of the invention will appear from the following description taken in connection with the drawing wherein:

FIGURE 3 is a perspective schematic view of the sprocket and shafts employed for actuating the lifting and lowering mechanism employed.

FIGURE 4 is a longitudinal sectional view of one of the raising and lowering racks employed.

FIGURE 5 is a perspective view of a portion of one of the raising and lowering racks.

FIGURE 6 is a fragmentary side elevational view of the bell crank, roller and track mechanism for raising the end panels of the trailer house.

FIGURE 7 is an end elevation partly in section of the mechanism shown in FIGURE 6.

Figure 1:
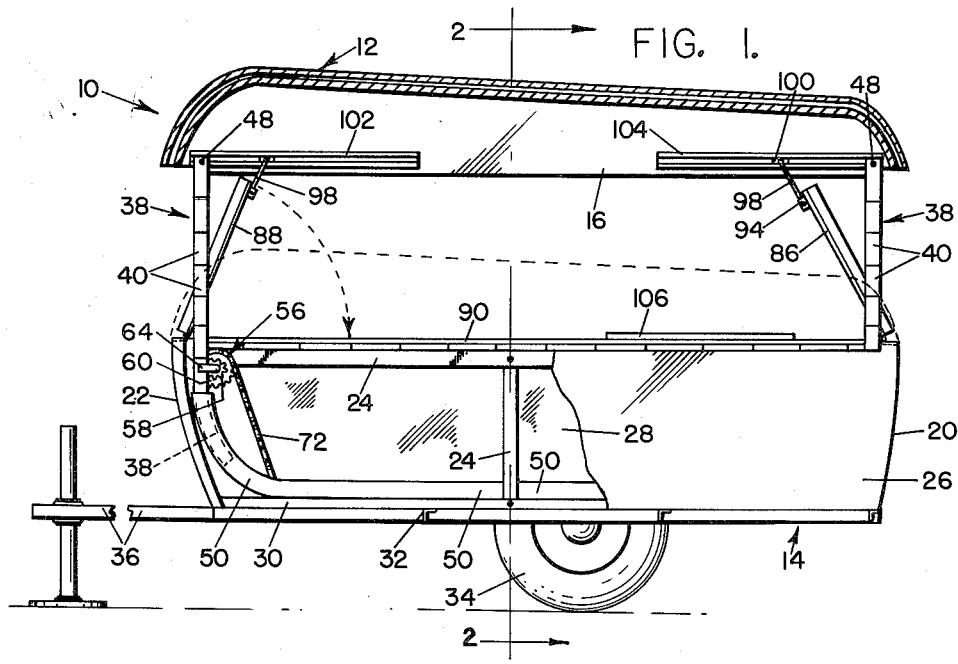
FIGURE 1 is a side elevational view partly in section showing the trailer in a raised position in full lines and showing in broken lines the top section in a collapsed position.

The trailer is indicated by the numeral 10 and includes a top section generally indicated by a numeral 12 and a lower section indicated in general by the numeral 14. When the top and bottom sections are in spaced relation the intervening space is enclosed by side and end panels which will be later described in detail and which are hingedly connected to the lower section.

The top panel 12 takes the form of a roof that is streamlined having the shape of an inverted shallow pan provided with side walls 16 and 18.

Figure 2:
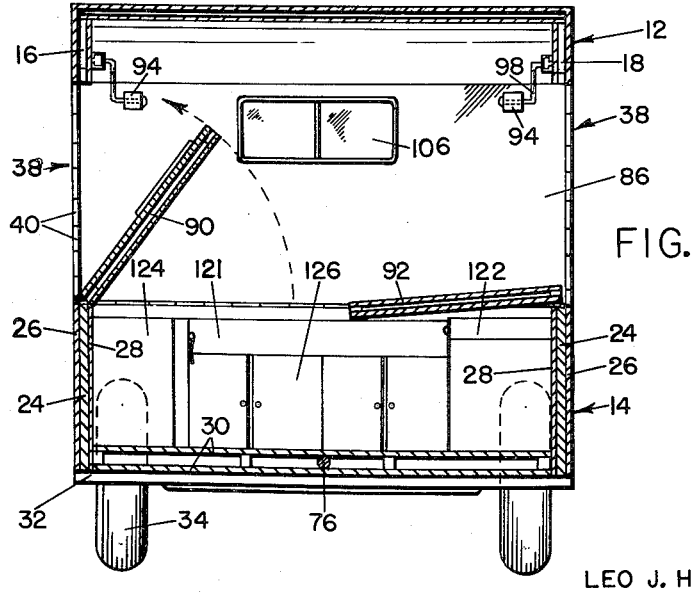
FIGURE 2 is a transverse vertical sectional view taken through the intermediate portion of the house trailer.

The lower section 14 is preferably constructed with streamlined end panels 20 and 22 which are double walls but not shown as such. The lower section also includes side walls embodying suitable frame members 24 which separate the outer side panels 26 from the inner wall panels 28, as is best seen in FIGURES 1 and 2. The lower section is further provided with a base portion 30 to which is fastened the conventional frame 32 and running gear 34. A hitch 36 is secured to the frame in any suitable manner such as by welding. It will be understood that the walls are all of the same thickness and that the double wall construction is hollow except for the frame members such as 22 and 24.

Racks, illustrated in general by the numeral 38 connect the upper and lower sections 12 and 14. These racks are usually four in number, and are preferably mounted at the corners of the sections. The racks are formed of a series of rack sections or links 40 having longitudinally grooved side edges 41 having longitudinally spaced teeth 42 in each groove. One end 43 of each link is bifurcated or grooved to receive cooperable tongues 44 at the other end of the adjoining link. The interfitting tongue and grooved ends 43 and 44 are connected by pivot pins 45 having their axes parallel to the teeth and located closely adjoining the grooved and toothed sides of the links. The corners of the pivotally connected link ends are rounded about a radius concentric with the pivot axes, so that the links may pivot about their pivot pins in one direction. The link ends 46 adjoining the tongues 44 abut against the ends 47 of the grooved link ends when the links are longitudinally aligned. Thus, in effect the links form a rigid chain or rack when the links are aligned, and are capable of withstanding substantial compressive force.

In the arrangement illustrated, the racks at the rear of the trailer are supported so as to be rigid when vertically aligned against lateral forces and rearward forces, and can pivot only in a forward direction. The racks at the forward end of the trailer are supported so as to be rigid when vertically aligned against lateral forces, or against forward forces, and can pivot only in a rearward direction. As a result, the forward racks hold the rear racks from collapsing inwardly and the rear racks similarly hold the forward racks from pivoting inwardly.

While the arrangement illustrated has constructional advantages, other arrangements can be employed, as long as the racks are in opposed pairs. For example, four pairs of racks could be used instead of two where larger trailers are made; and the opposed pairs of racks can be laterally opposed instead of longitudinally opposed as shown.

The racks 38 are secured at their upper extremities to the opposed side walls 16 and 18 by bolts 48, and the lower ends of the racks are disposed between the walls 26 and 28, passing through arcuate guide channels 50 which are attached to the lower section 14 between the side walls 26 and 28 as is best indicated in FIGURE 1. The guide channels 50 extend horizontally to the intermediate portion of the body and are secured to the frame member 24 in any suitable manner. It will be understood that the above described arrangement is identical on the opposite side of the trailer from that shown in FIGURE 1.

Each rack 38 is actuated by a double sprocket generally indicated at 56 having a smaller sprocket 58 which meshes with the teeth 42 of the links 40 and a connected sprocket 60 for purposes later to be described. The double sprockets 56 are rotatably mounted on stub shafts 62 which are secured between the side walls 26 and 28 at a point adjacent the top edge of the lower section 14. The ends of the shafts 62 are provided with guide brackets 64.

A pair of transversely disposed shafts 66 and 68 are situated and properly supported on the base portion 30 adjacent the ends 20 and 22 of the lower section 14 and are provided at their ends with sprockets 70 which are aligned with the sprockets 60. Small bicycle type link chains 72 connect the sprockets 70 and the sprockets 60.

The transverse shafts 66 and 68 are operatively connected and driven by bevel gears 74 mounted on the transverse shaft and cooperable bevel gears on a longitudinally disposed drive shaft 76 as is more clearly shown in FIGURE 3. The shaft 68 is provided with a pulley 78 and a belt 77 which is aligned with a further pulley 80 disposed on the shaft of a two directional electric motor 82. The motor is driven by a suitable battery such as 84. The double walled construction of the body section 14 is designed to accommodate the arrangement illustrated in FIGURE 3 wherein the intermediate portion of the shaft 76 is disposed between double panels of the base 30. The transversely disposed shafts 66 and 68 may be disposed similarly having their respective sprockets 70 disposed in perpendicular planes in the space between the walls 26 and 28. The sprockets 60 and the chains 72 are disposed between the walls 26 and 28 in alignment with the sprockets 70. It remains obvious that the pulley 78 may be disposed on the shaft 76 in alignment with the motor 82.

It will be understood that the motor may be replaced by a hand operated winch or the like and that if desired the motor 82 may be in direct communication with the battery of the auto which is towing the trailer. It will also be understood that the motor may be actuated by an exterior switch not shown.

As is indicated in FIGURE 1, the trailer body 10 is provided with end panels 86 and 88 and side panels 90 and 92 which are hingedly connected to the upper edges of the lower section 14. The end panels 86 and 88 are provided with means for automatically raising and lowering them as the top panel 12 is raised and lowered in spaced relation from the lower section 14. This includes bearing boxes 94 which are secured along the edge 96 and adjacent the top edge of the end panels 86 and 88 having bell cranks 98 rotatably mounted therein. The opposite ends of the bell cranks are provided with rotatably mounted rollers 100 which engage tracks 102 and 104 which are fixed to the side walls 16 and 18 of the top section 12. The tracks preferably engage the rollers 100 in such a manner that the rollers are held engaged in the tracks.

As the top section 12 is raised from the broken line position shown in FIGURE 1 to the full line position shown, the end panels 86 and 88 will raise from a collapsed folded position to a vertical position forming the end walls of the trailer body 10.

The side panels 90 and 92 are hingedly connected to the edge of the lower section 14 and are manually raised from a folded horizontal position to a raised vertical position as shown in FIGURE 2. The walls 90 and 92 may then be latched or hooked to the top section 12 in any suitable manner.

One of the sides of the section 14 and a complemental folding wall panel may be provided with a door not shown in the drawing and windows 106 may be provided in any number as desired in the side and end panels.

Figure 8:
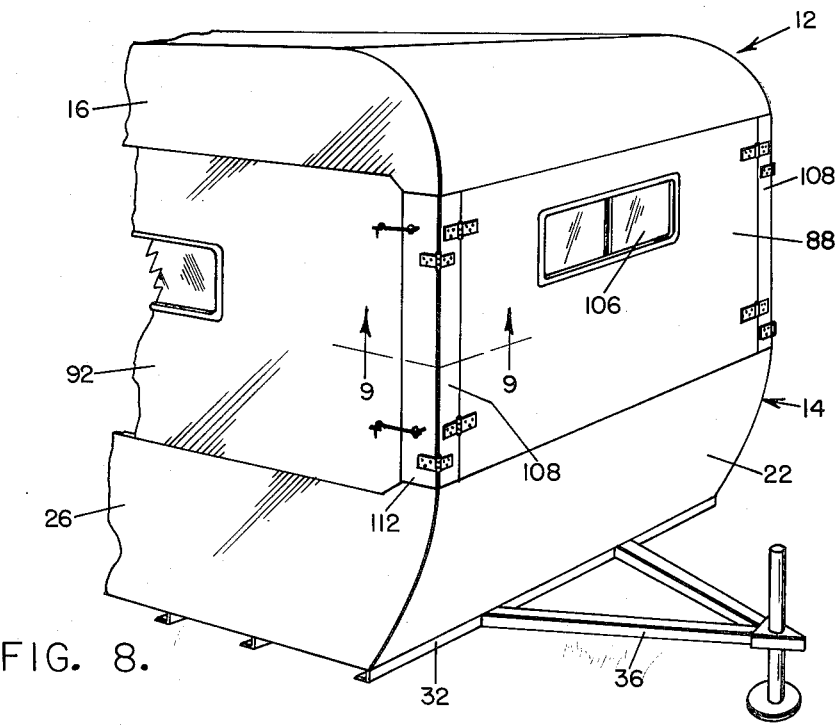
FIGURE 8 is a perspective view of the end and side panel connecting means employed.
Figure 9:
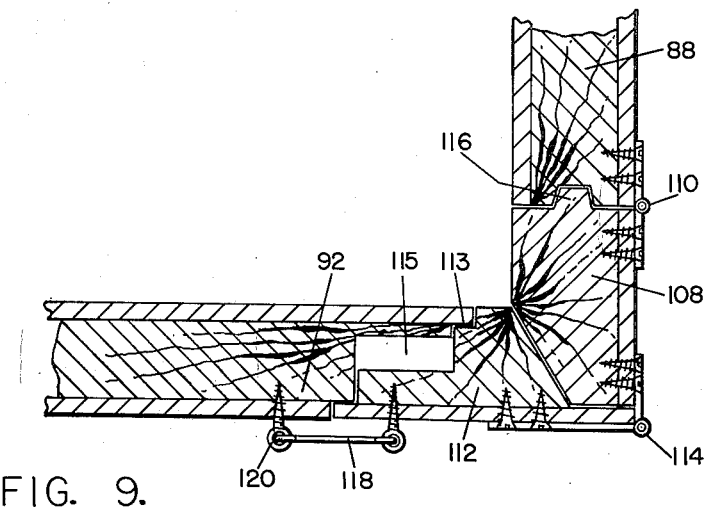
FIGURE 9 is a sectional view of the connecting means taken substantially on line 9—9 of FIGURE 8.

The manner of connecting the end panels 86 and 88 to the side panels 90 and 92 is most clearly indicated in FIGURES 8 and 9. It will be understood that all corner connecting means are identical and so for purposes of brevity only one of the corner connections will herein be described.

An end panel extension 108 is hingedly connected at 110 to the end panel 88. A side panel extension 112 is hingedly attached to the extension 108 as at 114. The extension 112 is rabbeted as at 113 to mesh with the end edge of the side panel 92. The numeral 115 indicates a space provided for the vertical position of the rack sections 38. The end panel 88 and the extension 108 are tongue and grooved as at 116 to provide a snug weatherseal between the side and end panels. A hook 118 and eye 120 may be provided to secure the extensions 108 and 112 in a right angular folded position as best shown in FIGURE 9.

With reference to FIGURE 2 is will be noted that certain elements are shown such as a mattress 121, stove 122, ice box 124 and storage space 126. Other similar elements may be provided and stored in the lower section 14 or may be hinged to the opposed end and side panels as desired.

Assuming that the trailer is in a folded or collapsed position, the user actuates the electric motor or other actuating means rotating the double sprockets in opposed directions through the pulley, bevel gear, and shaft arrangement as shown in FIGURE 3. The racks 38 will be urged upwards thereby raising the section 12 in spaced relation from the section 14. The end walls will raise simultaneously from a collapsed horizontal position to a vertical position forming the end walls of the trailer house. The side walls may then be normally raised and latched or otherwise secured in a vertical position to form side walls of the trailer house. This procedure is reversed when it is desired to collapse the house trailer.

A further description of the operation is believed obvious and therefore a more lengthy description is believed unnecessary.

From the foregoing specification it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded unnescesary.

Changes in shape, size, and arrangement of details and parts such as come within the purview of the invention claimed may be resorted to in actual practice, if desired.

I claim:

1. A collapsible and expanding house trailer having two sections in superimposed relation, racks secured between said sections and in opposed relation, said racks formed of a series of rigid links pivotally connected and having ends which abut when the links are in alignment and having spaced teeth on said links, arcuate guide members in one section having horizontal and vertical portions for guiding said racks from a horizontal inactive position to a vertical operable position to effect said alignment of links, sprockets for engaging the teeth of said racks to move said racks relative to said guide members, means for operating said sprockets whereby said sections may be abutted in parallel relation or may be held in superimposed spaced parallel relation, and that one of said racks will hold the opposed said racks from pivoting in the direction that the said racks are free to flex.

2. The construction described in claim 1 and in which said means for driving said sprockets includes shafts disposed through said sprockets and means for rotating said shafts in either direction.

3. A trailer including two elongated sections substantially rectangular in plan and in superimposed relation, means connecting said sections closely adjacent to the four corners thereof and within the confines of said sections, said connecting means comprising a series of rigid members pivotally connected together and engageable in end to end relation when aligned, curved guide means in one of said sections having horizontal and vertical portions for guiding said members from a horizontal storage position to a vertical operable position to effect said alignment of said members, means for moving said connecting means in unison, side and end walls hingedly connected to the upper edges of the lower of said sections, said side walls being of a length less than the longitudinal distance between said connecting means and said end walls being of a width shorter than the transverse distance between said connecting means whereby said side and end walls may fold between said connecting means from a generally vertical position to a generally horizontal position between said sections, and corner forming members hingedly connected to at least certain of said walls to which they are hinged and foldable from a position to connect the end edges of the side walls with the side edges of the end walls, enclosing said connecting means in raised position of the upper said section to a position outwardly of the walls to which they are hinged.

4. The structure of claim 3 and in which said guide means are located in the lower of said sections.

5. A collapsible and expanding house trailer having two elongated sections in superimposed relation, racks secured between said sections and in opposed relation, said racks formed of a series of rigid links pivotally connected and having ends which abut when the links are in alignment and having spaced sprocket engaging tooth means on said length, curved guide members in one section each having a longitudinally extending horizontal portion and a vertical portion for guiding said links from a horizontal inactive position to a vertical operable position to effect said alignment of links, sprockets for engaging the tooth means of said racks to move said racks relative to said guide members, means for operating said sprockets whereby said sections may be abutted in parallel relation or may be held in parallel spaced relation, the racks at each end of said sections being arranged to hold the racks at the opposite end thereof from pivoting longitudinally in the direction that the racks are free to flex.

6. The structure of claim 5 and including walls pivotally connected to the ends of the lower of said sections and foldable from a generally horizontal position between said sections to a generally vertical position between the ends of said sections, said walls being foldable between the racks at each end of said section and means pivotally and slidably connecting the upper portions of said wall to the upper of said sections, said walls and last named connecting means holding said sections from relative lateral movement.

References Cited in the file of this patent

UNITED STATES PATENTS

| | | |
|---|---|---|
| 1,998,937 | McGinnis | Apr. 23, 1935 |
| 2,483,332 | Brumbaugh | Sept. 27, 1949 |
| 2,574,657 | Pierce | Nov. 13, 1951 |
| 2,581,556 | Rogers | Jan. 8, 1952 |
| 2,836,456 | Schultz | May 27, 1958 |

FOREIGN PATENTS

| | | |
|---|---|---|
| 29,115 of 1930 | Australia | July 13, 1931 |
| 811,585 | France | Jan. 18, 1937 |